Jan. 5, 1937.      S. TALAGA      2,067,028
LOCK FOR PIPE COUPLINGS
Filed Oct. 9, 1935
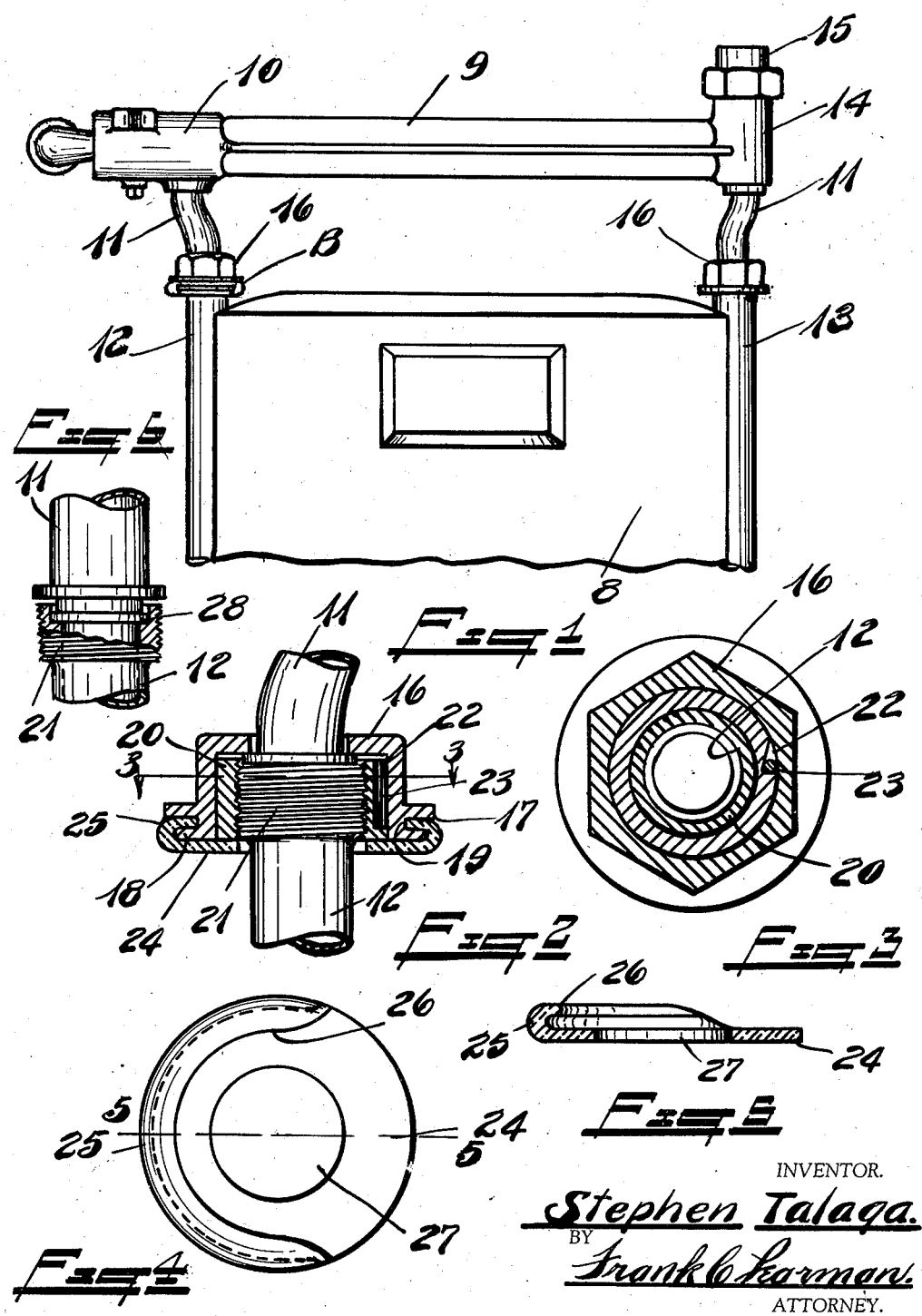
INVENTOR.
Stephen Talaga.
BY Frank C. Karman.
ATTORNEY.

Patented Jan. 5, 1937

2,067,028

UNITED STATES PATENT OFFICE 2,067,028

LOCK FOR PIPE COUPLINGS

Stephen Talaga, Bay City, Mich.

Application October 9, 1935, Serial No. 44,197

6 Claims. (Cl. 285—120)

This invention relates to locks for pipe couplings and more specifically to a lock mechanism for use in conjunction with a gas meter or similar device to prevent an unauthorized person from disconnecting the coupling and piping the gas around the meter so that the gas consumed will not be registered.

One of the prime objects of the invention is to design a lock for the pipe coupling including a rigid, fracturable member which must be broken to permit the disconnection of the coupling, and which when broken is readily discernible by a workman or any other person having access to the meter.

Another object is to design a coupling which when rotated in a clockwise direction serves to tighten the joint, and in which anti clockwise rotation in no manner affects nor does it unscrew or release the coupling.

A further object is to provide a fracturable locking member in which a saw cut, break, or fracture is easily recognized and noticeable, and which is very economical to manufacture and install.

A still further object is to provide a locking means of simple and practical design and which permits the coupling to be turned or rotated clockwise to tighten the members in position, but which when rotated anti clockwise for unscrewing will release so that the coupling nut may be rotated without unlocking or disconnecting the coupling assembly.

With the above and other objects in view, the present invention consists in the combination and arrangement of parts, hereinafter more fully described, illustrated in the accompanying drawing, and particularly pointed out in the appended claims, it being understood that changes may be made in the form, size, proportion, and minor details of construction, without departing from the spirit, or sacrificing any of the advantages of the invention.

In the drawing—

Fig. 1 is a fragmentary front elevational view of a gas meter showing my pipe couple lock in position.

Fig. 2 is an enlarged vertical sectional view of the coupling.

Fig. 3 is a sectional top plan view taken on the line 3—3 of Fig. 2.

Fig. 4 is a detail plan view of the locking member.

Fig. 5 is a section taken on the line 5—5 of Fig. 4.

Fig. 6 is a fragmentary part sectional view showing the joint.

In the drawing in which I have shown the preferred embodiment of my invention the numeral 8 indicates a gas meter of conventional design, the gas traveling therethrough so that the volume consumed may be registered, the travel being in the direction as indicated by the arrows. A horizontally disposed hanger bar 9 is provided on the meter and includes a sleeve 10 to which the pipe 11 is connected, a pipe coupling "B" being interposed between said pipe 11 and the meter spud 12 through which the gas flows to the meter, thence the gas flows up the pipe 13 through the pipe 14 and into a pipe line 15 which leads to a stove (not shown) or other gas-using appliance.

The coupling "B" is formed as clearly shown in Figs. 2 and 3 of the drawing, the numeral 16 indicating a hollow shell, the exterior being preferably hexagonal in shape, the lower end being formed with spaced apart flanges 17 and 18 to form a groove 19, and for a purpose to be presently described.

A sleeve member 20 is mounted in the shell 16 and is interiorly threaded as shown in Fig. 2 to engage the spud 12 which is rigidly secured to the meter, the end of said spud being enlarged and is threaded as at 21 to mesh with and engage the threaded interior of the sleeve.

An inclined slot 22 is provided on the outer periphery of the sleeve 20, and a vertically disposed pin 23 is mounted therein, said pin frictionally engaging the inner surface of the shell 16 so that when the shell is rotated in a clockwise direction, the pin 23 will roll up the inclined surface and tightly wedge against the inner surface of the shell so that the sleeve and shell will be rigidly locked together. Rotation of the shell in an anticlockwise direction merely causes the pin to roll into the deep end of the inclined slot, and the shell can then be continuously rotated without affecting the sleeve 20, so that should any unauthorized person seek to disconnect the coupling by manipulation of the shell 20, it will be obvious that the coupling will not be disconnected, and further that rotation in a clockwise direction only serves to lock the coupling tighter. I wish to direct particular attention to the fact that the diameter of the locking pin 23 is sufficient to provide a slight frictional contact with the inner surface of the nut 16 at all times.

A locking washer member 24 engages the flanged end of the shell 16 and prevents access to the sleeve when the coupling is assembled. This is formed as clearly shown in Figs. 4 and 5 of the drawing and is made up of fracturable material such as bakelite, glass, or a similar composition, the upper edge 25 being rolled over or rounded to form an overhanging lip 26 which extends substantially half way around the washer, this lip being received and accommodated in the groove 19 formed by the flanges 17 and 18.

A centrally disposed opening 27 is provided in the washer 24 and accommodates the threaded end of the spud 12, a gasket 28 being interposed between the end of the spud and the flanged end 29 of the pipe 11, thus providing a leakproof joint.

In assembling, the shell 16 is first placed on the pipe 11, the sleeve 20 with the locking pin 23 in position is then placed in the shell, the fracturable washer 24 is then mounted on the shell with the lip 26 engaging the groove 19; this assembly is then placed over the threaded end of the spud 12 and the shell rotated in a clockwise direction so that a tight, leakproof joint is provided.

To remove it it is merely necessary to tap the washer 24 with a hammer, wrench, or other instrument; this cracks or breaks the washer into small pieces and access can then be had to the lower end of the sleeve so that it can be held stationary while the shell is turned in an anti-clockwise direction to disengage it from the spud.

It will be noted that the edge of the washer is rounded so that any tampering will be readily noted and cuts or breaks be easily detected. It is also formed of a brightly colored material and could be formed with the initials or name of the company using it, and the outer surface of the shell is preferably hexagon shaped to facilitate manipulation by a wrench or other instrument.

From the foregoing description it will be obvious that I have perfected a very simple, practical, and economical lock for couplings which can be used over and over again, the only part requiring replacement being the fracturable washer 24 which must be broken each time the coupling is removed.

What I claim is:

1. In a device of the character described and comprising a shell formed with a groove adjacent the lower end thereof, a sleeve mounted in said shell, a locking pin mounted on said sleeve and adapted to lock the shell and sleeve together as a unit when the shell is rotated in a clockwise direction, and a washer formed with an overhanging lip adapted to be slidably mounted in said groove in the shell.

2. In a device of the character described and comprising a shell having a groove adjacent the lower end thereof, an interiorly threaded sleeve mounted in said shell and provided with an inclined groove on the outer surface thereof, a pin mounted in said groove and serving to lock the shell and sleeve together when the shell is rotated in a clockwise direction, and a washer of fracturable material and formed with a turned, inwardly projecting lip mounted on said shell and in engagement with said groove.

3. In a device of the character described and comprising a hollow shell adapted to receive a flanged pipe, a threaded sleeve receivable in said shell, a pin mounted on the sleeve and adapted to securely lock the shell and sleeve together as a unit when the shell is rotated in a clockwise direction, and a fracturable washer mounted on said shell for covering the lower end of the sleeve when the device is assembled.

4. In a device of the character described and comprising a hollow shell, an interiorly threaded sleeve mounted in said shell, means for locking the sleeve and shell together when the shell is rotated in a clockwise direction, and a washer formed of fracturable material mounted on and covering the lower end of the shell when the members are placed in assembled relation.

5. In a device of the character described and comprising a hollow shell, an interiorly threaded sleeve mounted in said shell, a locking pin on the sleeve for locking the sleeve and shell together when the shell is rotated in a clockwise direction and permitting free rotative movement of the shell in an anti clockwise direction, and a fracturable washer mounted on said shell for concealing the lower end of the sleeve when the device is assembled.

6. In a device of the class described and comprising a shell, a groove provided therein, an interiorly threaded sleeve mounted in said shell, a locking member mounted on the sleeve and adapted to lock the sleeve to the shell when the shell is rotated in a clockwise direction, a washer formed of fracturable material located on said shell, and a lip on the washer for engagement with the groove in said shell.

STEPHEN TALAGA.